May 30, 1933.  G. B. WEAVER  1,911,659
HIGH PRESSURE JOINT FOR CAST IRON PIPE
Filed Feb. 15, 1932  2 Sheets-Sheet 1
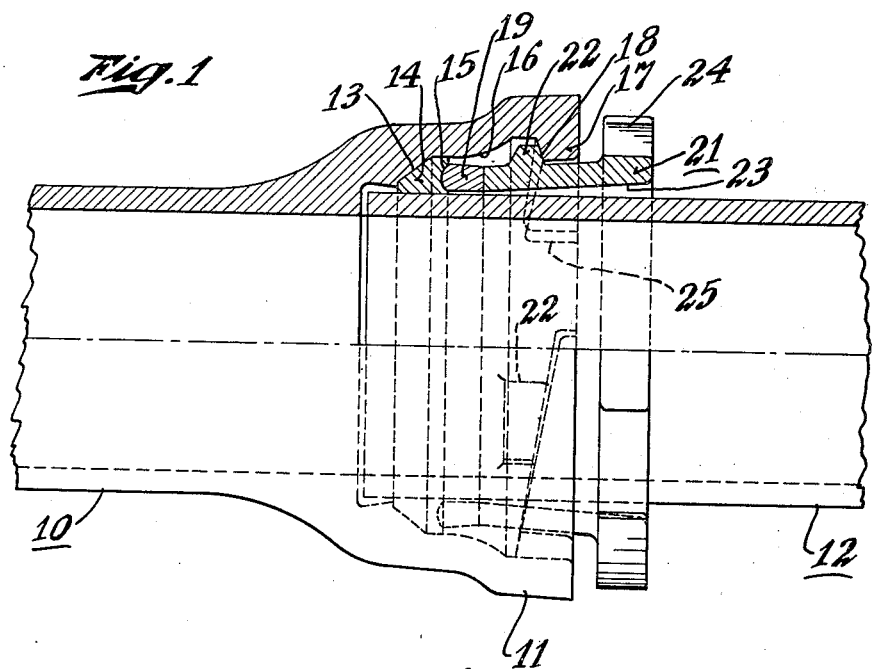
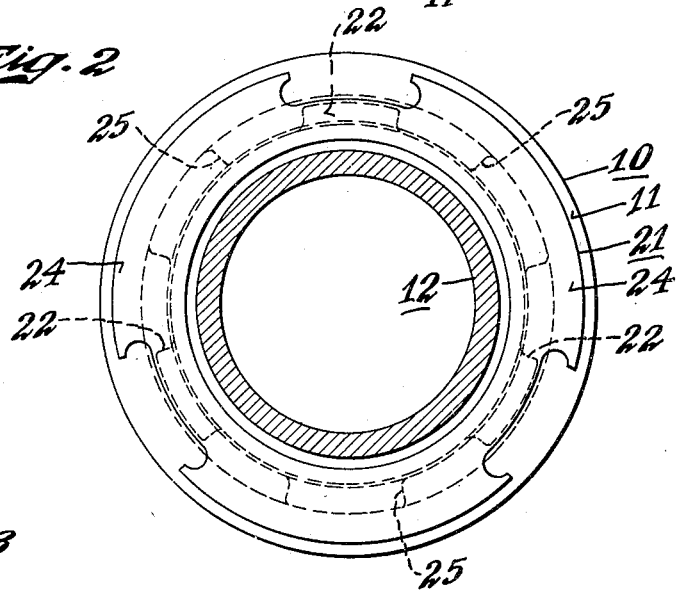
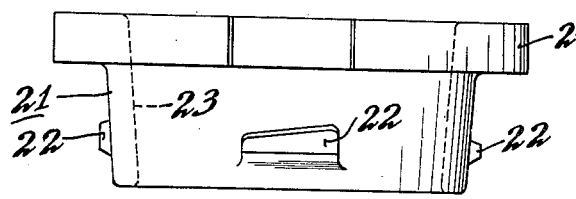
INVENTOR
George B. Weaver
By Johnston & Jennings
ATTORNEYS May 30, 1933.    G. B. WEAVER    1,911,659
HIGH PRESSURE JOINT FOR CAST IRON PIPE
Filed Feb. 15, 1932    2 Sheets-Sheet 2

INVENTOR
George B. Weaver
BY
Johnston + Jennings
ATTORNEYS

Patented May 30, 1933

1,911,659

UNITED STATES PATENT OFFICE

GEORGE B. WEAVER, OF BIRMINGHAM, ALABAMA, ASSIGNOR TO NATIONAL CAST IRON PIPE COMPANY, A CORPORATION OF DELAWARE

HIGH PRESSURE JOINT FOR CAST IRON PIPE

Application filed February 15, 1932. Serial No. 592,894.

My invention relates to pipe joints, more particularly to an improved type of high pressure joint for the bell and spigot ends of cast iron pipe, and has for its object the provision of apparatus of the character designated which shall be simple of design, economical in manufacture, easily assembled in close places, and capable of withstanding high pressure.

My invention relates particularly to that type of joint for bell and spigot ends of cast iron pipe which employs a soft rubber or similar packing ring, a gland for compressing the packing ring, and a bayonet joint connection between the gland and the bell end of the pipe. Joints of this general character have heretofore been proposed employing both a continuous inclined thread and an interrupted or bayonet type of thread. With such joints with which I am familiar, difficulties have been encountered in securing adequate pressure upon the soft packing ring for the joint to withstand the relatively high liquid and gaseous pressures encountered in pressure lines. This has been due particularly to the difficulty of engaging the gland and turning it to compress the packing ring within the confines of the narrow ditch in which such pipe is usually laid.

It is accordingly one of the principal objects of my invention to provide an improvement on joints of the character above mentioned, wherein higher gland pressures on the packing ring than have heretofore been obtainable may be readily obtained.

In carrying out my invention, I provide the bell end of the pipe with inwardly extending shoulders having inclined faces adapted to be engaged by lugs on the gland fitting into the bell end of the pipe, and design the inclined faces of the shoulders with a variable pitch whereby the engaging lugs, on being turned, cause the gland to rapidly seat the soft packing ring during the first part or initial rotary movement of the gland, followed by slower inward movement of the gland during the finishing part of the turning movement to obtain sufficient compression to make a tight joint.

The inclined faces of the shoulders are thus given a relatively steep pitch for engaging the lugs during the early part of the movement, followed by a relatively flat pitch for the later part of the rotary movement of the gland. I have found with my improved type of joint that it may be made gas and liquid tight within the limits of the pressure for which the pipe is designed, with a minimum exertion of force by the mechanic assembling the joint.

Apparatus embodying features of my invention is illustrated in the accompanying drawings forming a part of this application, in which Figure 1 is a longitudinal section of a joint made in accordance with my invention;

Figure 2 is a sectional view taken along the line II—II of Figure 1;

Figure 3 is an elevation view of the gland member removed from the joint;

Figure 4:
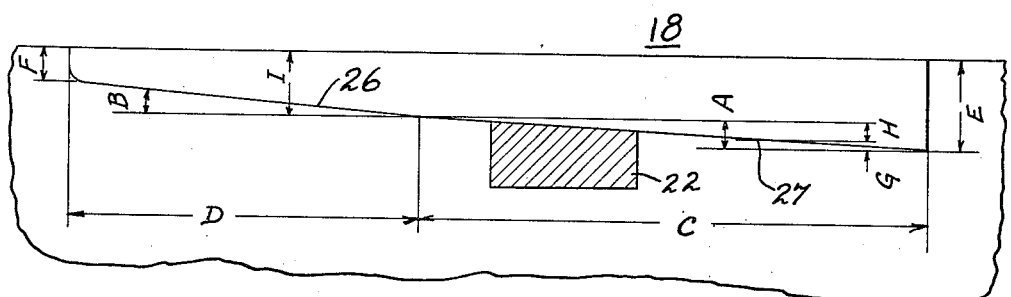
Figure 4 is a detailed view, drawn to an enlarged scale, and illustrating the variable pitch of the face of one of the shoulders on the bell end of the pipe.

Referring to the drawings for a better understanding of my invention, I show a pipe 10 having a bell 11. Fitting into the bell 11 is the spigot end 12 of another section of pipe adapted to be sealed with my improved joint. At the bottom or inner end of the bell 11 I provide an outwardly flaring bevelled surface 13 adapted to receive a packing ring 14 surrounding the spigot end 12. The packing ring 14 is preferably made of soft rubber, and may be tipped with lead. It has a grooved surface 15 which acts as a centering device for compression ring. From the packing ring 14, the bell flares outwardly along a portion 16 but at a reduced angle compared to the portion 13. Formed on the inner side of the bell near the outer end are a plurality of inwardly extending shoulders or protuberances 17 having inclined faces 18.

Fitting within the bell 11 around the spigot end 12 and bearing against the packing ring 14 is an iron compression ring 19 bevelled on one end to interfit with grooved packing ring 14. Bearing against the compression ring 19 is a gland member 21 which is provided with lugs 22 adapted to engage the shoulders 18 of the bell 11. The engaging surfaces of the lugs 22 are inclined complementary to the inclined faces of the protuberances 18. The gland 21, as will be seen in the drawings, is formed to flare outwardly slightly along its inner surface 23 where it surrounds the spigot end 12, whereby to permit a slight angular movement of the spigot end of the pipe relative to the bell end and permit its being laid with a slight bend. Formed on the gland 21 are a plurality of ears 24 which are adapted to be engaged by a spanner wrench or other tool to tighten the gland in the joint, or gland 21 may be made with plane surfaces such as hexagonal or octagonal instead of with ears. As the gland 21 is turned it bears against the ring 19 so that there is no rotary movement of the gland against the packing ring.

Referring now particularly to Figure 4 of the drawings, I show a detail of one of the shoulders 18. When the gland 21 is entered in the joint, the lugs 22 are turned so as to enter through slots 25 in the face of the bell, then by radial movement to engage the shoulders 18 and the gland 21 is then turned clockwise to engage the lugs with the shoulders. For approximately one-third of the distance of the face of the shoulders 18, indicated by the letter D in the drawings, I form the face 26 of each of the shoulders with an angle B relative to a plane normal to the pipe axis. The portion 27 of the face of each shoulder is formed with an angle H relative to said plane, which angle is about one-half that of the angle B. The distance on the shoulder comprising this flatter angle is indicated by C on the drawings. By this variation in the angle of the inclined surfaces, as the gland is turned, the lugs 22 engaging the relatively steep angle surfaces 26 of the shoulders 18 move inwardly at a relatively rapid rate per unit of angular movement to seat and place initial compression upon the packing ring 14.

Figure 5:
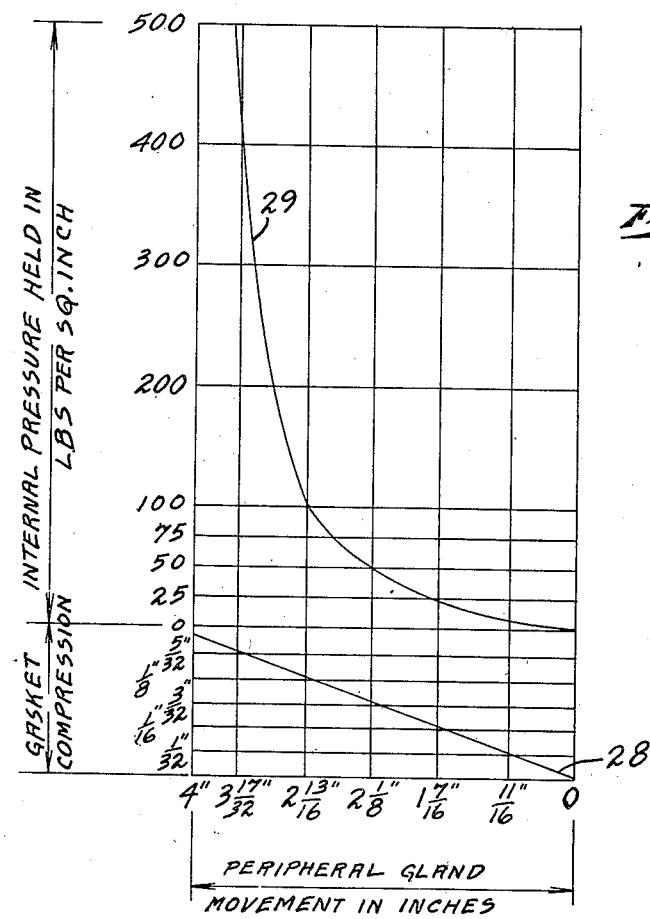
Figure 5 is a graphical view illustrating the rate of compression on the packing ring as developed with my improved joint.

In Figure 5 I have shown graphically the effect of compression on a soft rubber gasket in a gland type joint. In the lower part of this figure, the abscissa represents the peripheral gland movement upon rotation thereof while the ordinates represent axial movement of the gland. The curve 28 indicates the axial compression of the gasket responsive to angular movement of the gland for the assumed inclinations or pitches of the bell thread 18. In the upper part of Figure 5 the ordinates are graduated in pounds pressure per square inch in the pipe and the curve 29 indicates the pressure in pounds per square inch which the gasket will resist responsive to the peripheral and axial movements shown by the curve 28.

As will be seen, by referring to Figure 5, when the gland has been rotated 2⅛ inches there has occurred an axial movement of 3/32 inches and the joint will withstand a pressure of 50 pounds per square inch. When rotated 2⅜ inches there is an axial movement of the gland of ⅛ inch and the joint will withstand 100 pounds pressure per square inch in the pipe. Upon compression of the gland 1/32 inch more, the joint will withstand a pressure of 400 pounds per square inch.

With my improved joint, the pitch of the surface 26 for the distance D is such that the initial compression of the gasket, which offers little resistance during the initial axial movement of the gland, is at a relatively rapid rate, while the final axial movement where greater resistance is encountered, and where the pressure on the gasket increases at a more rapid rate per unit of axial movement of the gland, is at a slower rate. This later movement is controlled by the surface 27 of the shoulder 18.

Experiments with my improved type of joint has developed that a load of 500 pounds per lineal inch of projected gasket is the average required to make a joint of this type gas and liquid tight under any practical high pressure operation. If the pitch of the face of the shoulders 18 were made equal to the angle B throughout, the resistance to turning of the gland 21 would be such that by the time the lug 22 had passed the length of the surface D it would be extremely difficult to secure this high gland pressure on the packing ring. In designing my improved joint for different sizes of pipe, it will be obvious that the angle of the faces of the shoulders would be made relatively smaller for larger sizes of pipe than for the lesser sizes, but the angle of approach and the change in pitch may be readily calculated from basic test data to give the required pressure upon the packing joint.

There is another feature of prime importance for high pressure pipe joints and this is the provision of the necessary frictional engagement between the lugs and shoulders to prevent slippage after the joint has been fully set up. I have found that unless ample frictional engagement is allowed for these high pressure joints under ground tremors and vibrations from heavy traffic will work loose. But as provision for frictional engagement is increased the resistance of the joint to set it up increases and here again we find the necessity for flattening the angle over the shoulder portion 27 (Fig. 4). In this view it will be noted that the lug 22 has its working face in full frictional engagement with this portion of the shoulder face.

Hence it will have only a line contact with the shoulder portion 26 which is sufficient to effect rapidly the initial compression of the joint packing, but to finish the compression the flattening of the working angle compensates for the increased frictional engagement of the lug and portion 27 and enables the joint to be brought and held under the high compression requisite for packing high pressure pipe joints.

From the foregoing it will be apparent that I have devised an improved pipe joint, which is simple of design, may be readily assembled, and which is effective to withstand high gas or liquid pressure.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. A mechanically sealed bell and spigot joint for cast iron pressure pipe, which comprises tapered spaced lugs on the interior of the bell, a ring of compressible packing material which fits in the bell and surrounds the spigot, a metallic slip ring fitting against said compressible ring, a gland adapted to enter the bell and which fits loosely around the spigot and seats against said slip ring, and tapered lugs on the exterior of the gland which are adapted to pass between the bell lugs and by angular movement of the gland to engage said latter lugs, each pair of coacting wedge lugs comprising one lug having plane faces disposed with different degrees of pitch, the slighter pitched face being disposed in position to complete the axial movement of the gland into the bell to bring said ring under final compression.

2. A joint for pressure pipe according to claim 1, in which the lugs on the bell have their tapered faces formed in two planes having different degrees of pitch.

3. A joint for pressure pipe according to claim 1, in which the other lug of said coacting pair has a single wedge face, the pitch of which will match the pitch on the coacting lug with which it is engaged when the gland has come to rest in its final working position.

4. A mechanical form of joint for cast iron pressure pipe, which consists of a bell with tapered spaced lugs on its interior, a gland which enters into said bell, a ring of rubber or other compressible material adapted to fit in the bell and surround the pipe joint spigot, a metallic slip ring fitted against said compressible ring, said gland being adapted to surround the spigot and to seat against said spigot ring, and lugs on said gland adapted to pass between and engage the tapered faces of the lugs on the bell so that by slightly rotating the gland it travels into the bell, compressing the said ring and sealing the joint, said bell lugs having plane taper faces disposed with different degrees of pitch, the lower degree being disposed to work in completing the compression of the joint ring.

5. A mechanical form of joint for cast iron pressure pipe according to claim 4, in which the compressible ring is formed with a substantially central groove surrounding its outer end and the slip joint is formed at its inner end with a complemental annular shoulder adapted by engagement with said groove to cause the gland to be centered in the joint and on said ring as it is forced home.

In testimony whereof I, GEORGE B. WEAVER, affix my signature.

GEORGE B. WEAVER.